United States Patent
Davison et al.

(10) Patent No.: US 6,439,039 B1
(45) Date of Patent: Aug. 27, 2002

(54) METHOD TO VERIFY COLD START SPARK RETARD

(75) Inventors: Lynn Edward Davison, Saline; Arthur Joseph Varady, Chelsea; Cheryl Jeanette Stark, Canton; John Michael Kacewicz, Riverview, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,441

(22) Filed: Sep. 4, 2001

(51) Int. Cl.⁷ ............................................. G01M 15/00
(52) U.S. Cl. ..................................................... 73/117.3
(58) Field of Search ................................ 73/116, 117.2, 73/117.3, 118.1; 340/438, 439, 441

(56) References Cited

U.S. PATENT DOCUMENTS

| | | | |
|---|---|---|---|
| 4,428,344 A | * 1/1984 | Focht | 123/406.36 |
| 4,442,814 A | * 4/1984 | Kubozuka | 123/406.19 |
| 4,819,599 A | * 4/1989 | Chemnitzer | 123/403.36 |
| 4,844,026 A | * 7/1989 | Tomisawa | 123/406.25 |
| 4,987,874 A | * 1/1991 | Katayama et al. | 123/406.51 |
| 5,040,509 A | * 8/1991 | Nakaki et al. | 123/406.51 |
| 5,056,360 A | 10/1991 | Dosdall et al. | |
| 5,109,695 A | 5/1992 | James et al. | |
| 5,573,474 A | * 11/1996 | Marsh et al. | 477/111 |
| 5,701,865 A | * 12/1997 | Thomas et al. | 123/339.11 |
| 5,753,804 A | 5/1998 | La Palm et al. | |
| 5,824,890 A | 10/1998 | La Palm et al. | |

\* cited by examiner

Primary Examiner—Eric S. McCall
(74) Attorney, Agent, or Firm—Carlos Hanze

(57) ABSTRACT

Methods of utilizing engine 15 crankshaft acceleration 17 to monitor cold start spark retard are presented. A first method utilizes a variance in a crankshaft acceleration based deviation signal 21 and looks for changes in the variance to confirm if cold spark retard has occurred by the ignition system. In a second method, a threshold level of a group of cylinder crankshaft acceleration deviation signals Δ, can be detected and compared to a level of crankshaft deviant acceleration when normal spark is commanded to determine if commanded spark retard has been realized.

11 Claims, 5 Drawing Sheets

METHOD TO VERIFY COLD START SPARK RETARD

BACKGROUND OF INVENTION

The present invention relates to a method of operating a reciprocating piston internal combustion engine and more particularly, to a method of verifying cold start spark retard in a reciprocating piston internal combustion engine.

To limit $CO_2$, $NO_x$ and other gaseous emissions, most vehicles are equipped with a catalytic converter. A chemical catalyst (typically a rare earth metal) of a catalytic converter is not fully operational until it reaches a temperature range of between 700° F. and 800° F. Accordingly, when a vehicle is initially starting, the catalytic converter will not be fully warmed and its efficiency will be reduced. Typically, the catalytic converter reaches operating temperature (commonly referred to as light off temperature) in approximately 90 seconds of normal operation of the vehicle engine.

To further reduce emissions from a vehicle engine, it is desirable to heat the catalytic converter catalyst when the engine starts from a cold start at a quicker pace so that it more readily reaches its optimum temperature. One method to preheat the catalyst is to retard the spark in the engine cylinders. Retarding the spark in the cylinder causes a less complete combustion and therefore places more $CO_2$ within the engine exhaust. The increased $CO_2$ within the engine exhaust is oxidized within the catalytic converter causing the catalyst to heat at a faster rate.

An engine controller will typically only command a cold start spark retard when certain conditions are met. If the vehicle has been sitting for a prolonged period of time, the controller will cause the starting operation of the engine to have a retard operation. To determine if the engine is cold, typically the controller will rely on an engine coolant temperature sensor. In situations when the engine does not employ spark retard during a cold start, a vehicle operator is alerted that their engine emission control system is not functioning in an optimum desired manner. The alert is usually a message displayed on the instrument panel, such as "check engine."

The engine control system has a series of spark drivers which deliver a voltage charge to a primary coil. However, the timing of spark within the combustion chamber is also dependent upon a discharge of a secondary coil. Therefore, spark retard cannot be confirmed by comparing a crankshaft angular positional sensor signal with a signal output provided by a spark driver. Accordingly, to monitor the exact timing of a spark within a cylinder requires instrumentation which is impractical for a production vehicle. It is therefore desirable to provide confirmation of spark retard in a manner that is set free from a reliance upon ignition system electrical datum.

SUMMARY OF INVENTION

To make manifest the above noted and other desires, a revelation of the present invention is brought forth.

In one preferred method of the present invention, an engine emission control system utilizes crankshaft acceleration to monitor cold start spark retard. The present invention utilizes a variance in a crankshaft acceleration based deviation signal and looks for changes in the variance to confirm if cold spark retard has occurred by the ignition system.

In a second preferred method of the present invention, a threshold level of a group of cylinder crankshaft acceleration deviation signals can be detected and compared to a level of crankshaft deviation acceleration when normal spark is commanded to determine if commanded spark retard has been realized.

Other features of the invention will become more apparent to those skilled in the art from a reading of the following description and upon reference to the drawings.

DETAILED DESCRIPTION

Figure 1:
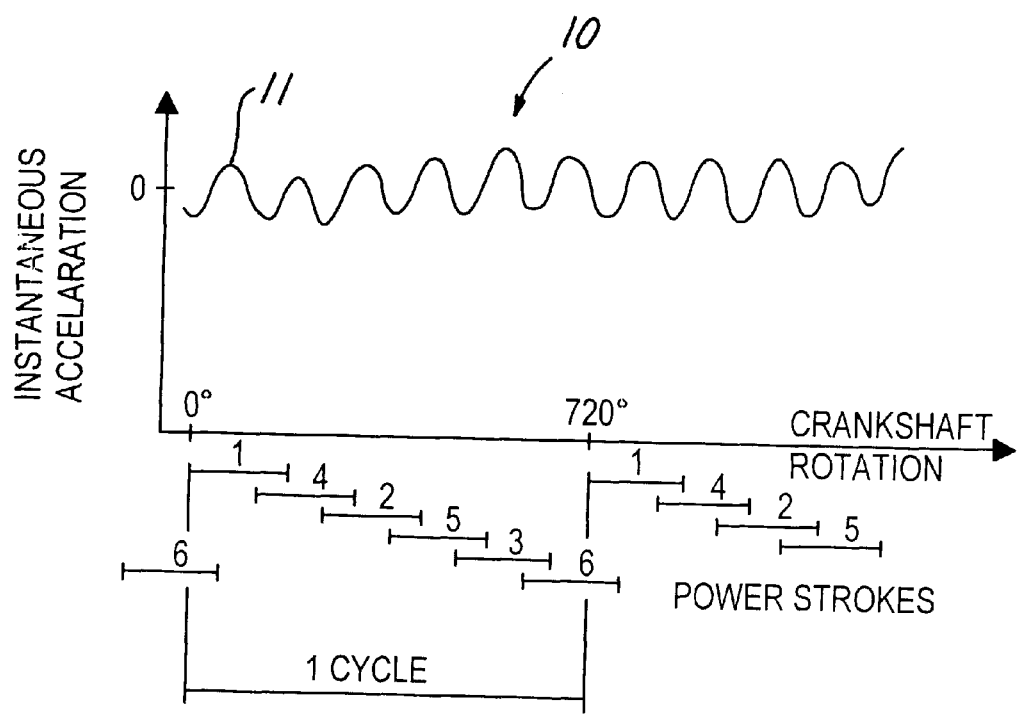
FIG. 1 is a plot showing instantaneous acceleration versus crankshaft rotation for normal cylinders.

The four strokes of a typical four-stroke combustion engine are the intake stroke, the compression stroke, the power stroke, and the exhaust stroke. As FIG. 1 illustrates, the power strokes of the respective cylinders are arranged in a particular order according to crankshaft position. In any engine having more than four cylinders, the power strokes of different cylinders will overlap. One engine cycle is comprised of 720 degrees of crankshaft rotation during which each cylinder passes through each of its four strokes.

Curve 10 of FIG. 1 shows approximate acceleration fluctuation during engine operation. An acceleration peak 11 occurs during the firing interval of cylinder No. 1 and other maximums in the acceleration curve occur corresponding to each other properly firing cylinder. Thus, although power strokes overlap, their individual effects are at least partially separable into distinct acceleration fluctuations.

Figure 2:
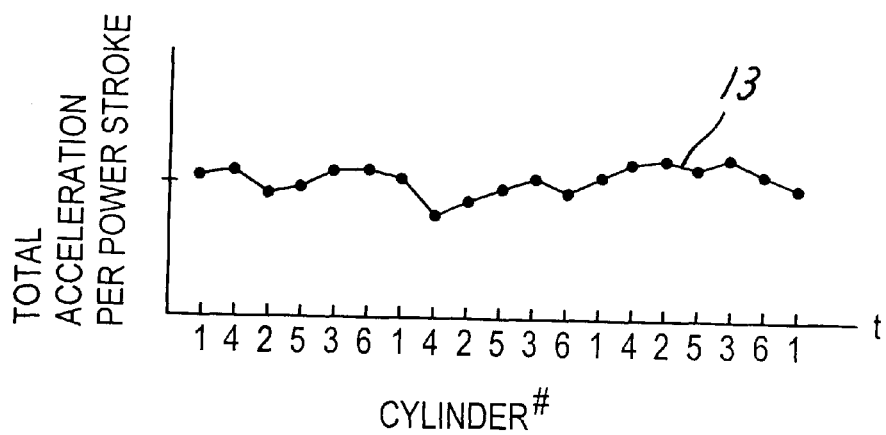
FIG. 2 is a plot showing instantaneous acceleration per firing interval versus cylinder number for an operating engine.

The accuracy required to measure angular rotation and time to derive the resolution shown in FIG. 1 is not feasible or desirable in on-board automotive systems. Rather, approximately one velocity measurement per firing interval is taken and the difference between successive velocities is calculated to determine one total acceleration measurement per cylinder. Such acceleration calculations are plotted in FIG. 2. Curve 13 shows the variation which can be measured and the total acceleration between firing intervals of successive cylinders and the firing order of the combustion engine. Unfortunately, the curve shown in FIG. 2 does not give a reliable indication of the presence or non presence of spark retard.

Figure 3:
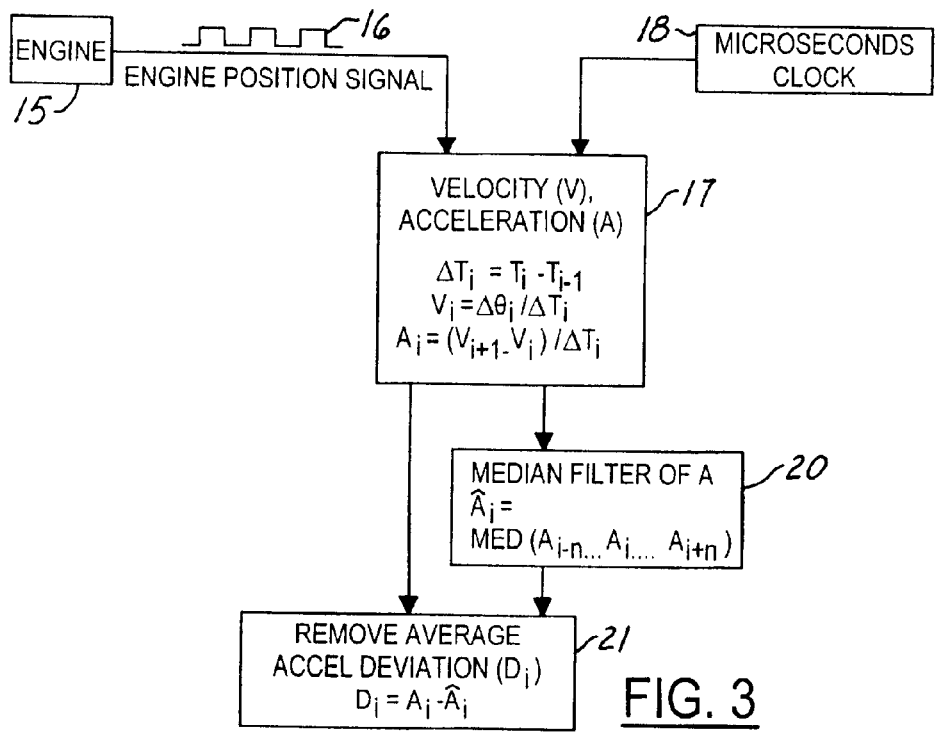
FIG. 3 is a block diagram illustrating the generation of crankshaft acceleration deviation of the present invention.

FIG. 3 shows the present invention in greater detail. An engine 15 provides engine position signals 16 at predetermined rotational positions. Engine position signals 16 are provided to an acceleration block 17 which also receives clock signals from a clock 18 used to calculate velocity $V_i$ and acceleration $A_i$ for each firing interval i. For example, where each engine position pulse in engine position signal 16 is in predetermined relation with the beginning of a respective top dead center, then an elapsed time $\Delta T_i$ for an i'th firing interval is determined by the passage of time between the i'th position pulse and the i+1 position pulse (usually determined from pulse rising edge to rising edge) The velocity $V_i$ over firing interval i equals the angular rotation between rising edges divided by the time elapsed between their respective passage past a fixed point. Acceleration $A_i$ for firing interval i equals the immediately following velocity measurement $V_i$ minus the respective velocity $V_i$ divided by elapsed time period $\Delta T_i$. A preferred method for velocity and acceleration measurement is disclosed in Dosdall, et al, U.S. Pat. No. 5,056,360, which is incorporated herein by reference in its entirety.

All of the calculations shown in FIG. 3 are preferably performed in an on-board microcomputer such as an electronic engine control (EEC) which is connected to various engine sensors as known and appreciated in the art. The above noted method of generating acceleration deviation is typically preferable, but other techniques can be utilized within the present invention.

The acceleration measurements $A_i$ are provided by acceleration block 17 to an averaging block 20. The $A_i$ measurements are preferably provided continuously or in large groups for processing. A series of acceleration measurements $A_{i-n}$ to $A_{i+n}$ are median averaged in order to determine the gross acceleration of the engine.

A difference block 21 receives the $A_i$ measurements from acceleration block 17 and the average accelerations $\bar{A}_i$ about each individual acceleration from averaging block 20. The difference between an individual acceleration and the average acceleration centered on that individual acceleration measurement provides an acceleration deviation $D_i$.

Figure 4A:
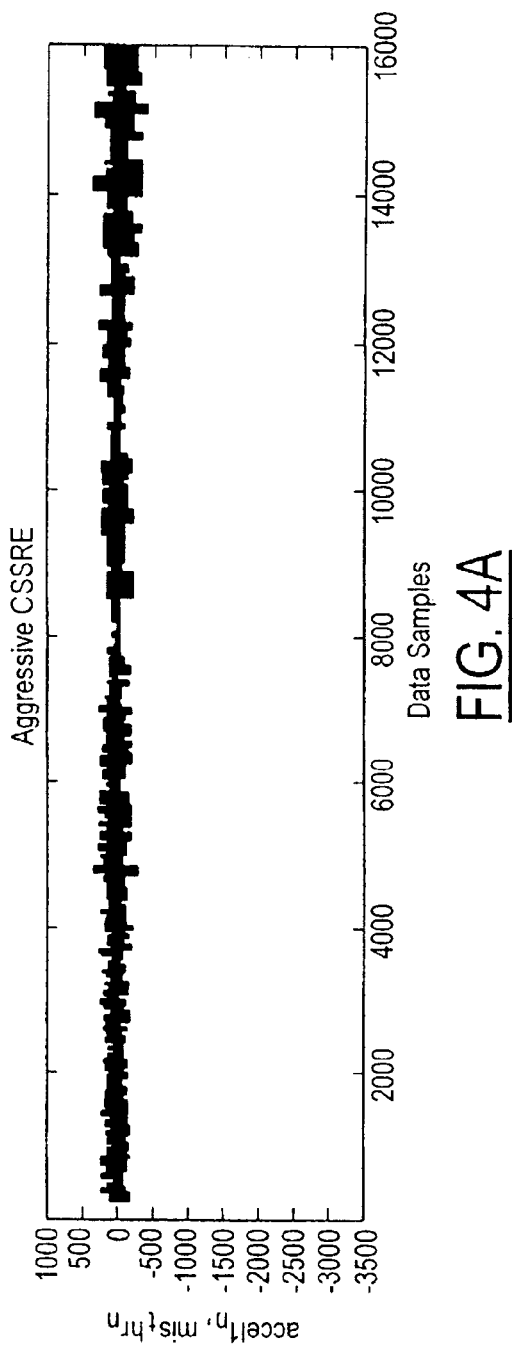
FIGS. 4A and 4B are graphs illustrating the difference in the variance of the crankshaft acceleration deviation according to the present invention.

Referring to FIG. 4A, a graph is shown of the deviant acceleration or a $\Delta A$ for a representative number of cylinders of the internal combustion engine. Typically, the representative number will be all of the cylinders. The $\Delta A_i$ would typically have a significant variance. Variance is significantly increased in the presence of spark retard.

Figure 4B:
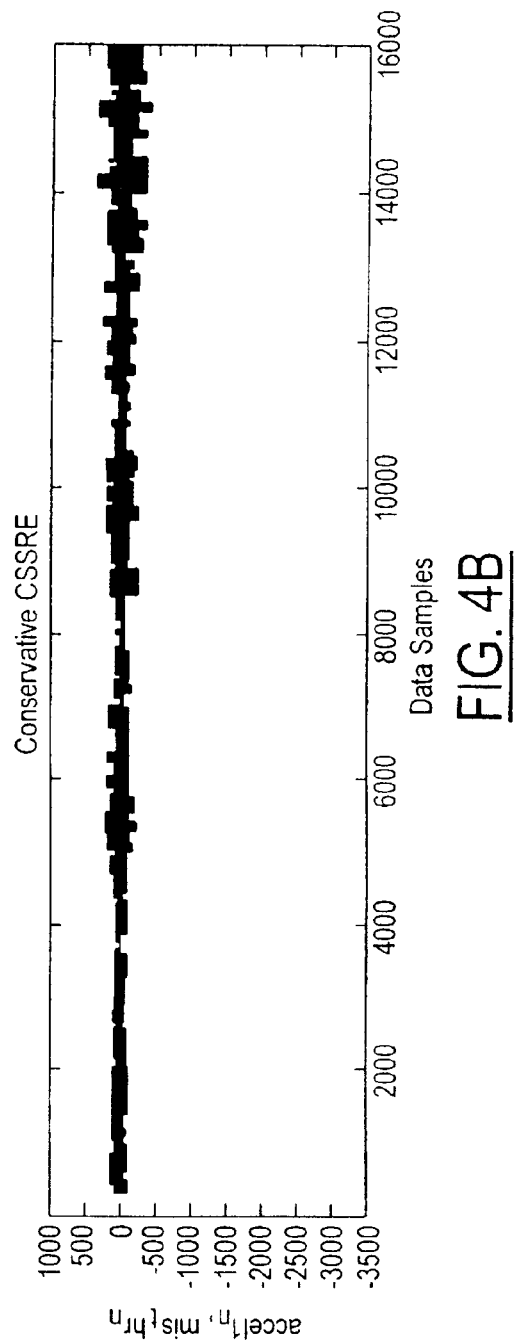

FIG. 4B is a graph of the acceleration deviation signal for the representative cylinders of an engine with nominal or normal spark operation. The FIG. 4A graph of the same engine has a 20° commanded cold start spark retard.

Figure 5:
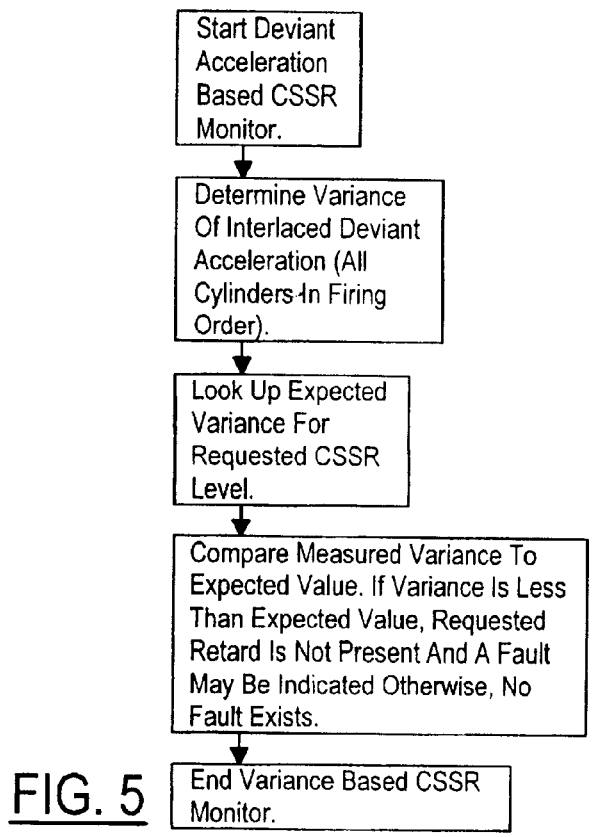
FIG. 5 is a flow chart illustrating operation of a method of the present invention when utilizing changes in variance of the crankshaft acceleration deviation signal.

Referring additionally to FIG. 5, in operation, the cold start spark retard read by the engine controller is compared with the nominal amount to determine a signal variance. The determined variance of the measured acceleration deviation signal is then compared with an expected variance which is preprogrammed in a map of the controller. If expected spark retardation has occurred, a signal will be generated and delivered to an archive of the engine controller that commanded spark retard has occurred. Upon comparison, if the crankshaft acceleration deviation signal variance is less than which should occur, an error signal will be generated and in a preferred embodiment, the vehicle operator will be informed that the emission system is operating improperly by appropriate message code. The message can be a light, an icon display, text message, audible tone or any other suitable visible or audible indicator. Monitoring of cold start spark retard will end at approximately 8000 data samples. Thereafter, cold start spark retard will cease operation and normal engine operation will resume.

Figure 6A:
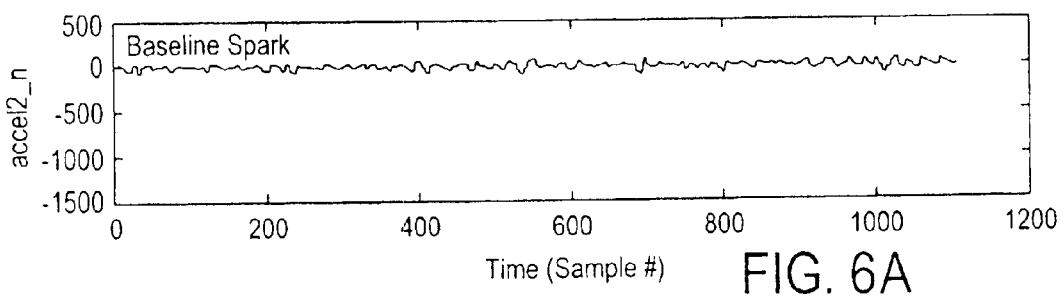
FIGS. 6A through 6E are views of variance measured acceleration with spark retard for a plurality of spark angles.
Figure 6B:
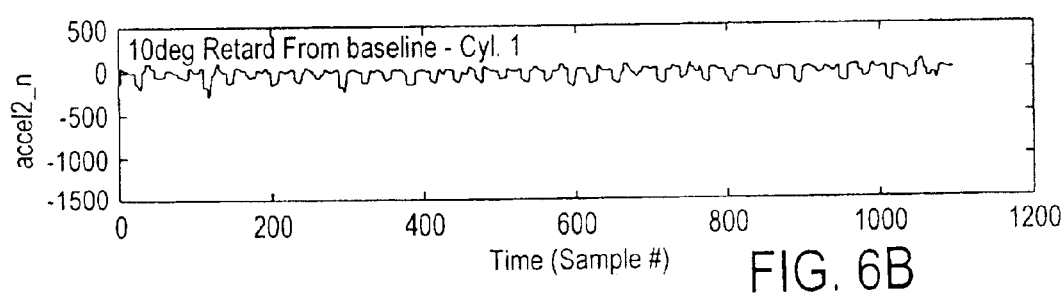
Figure 6C:
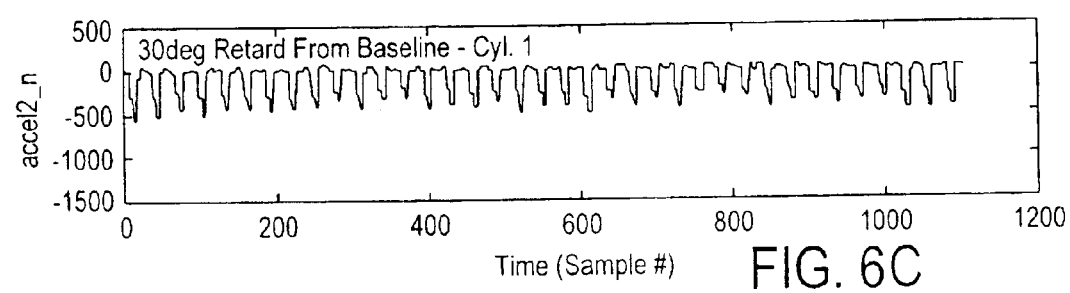
Figure 6D:
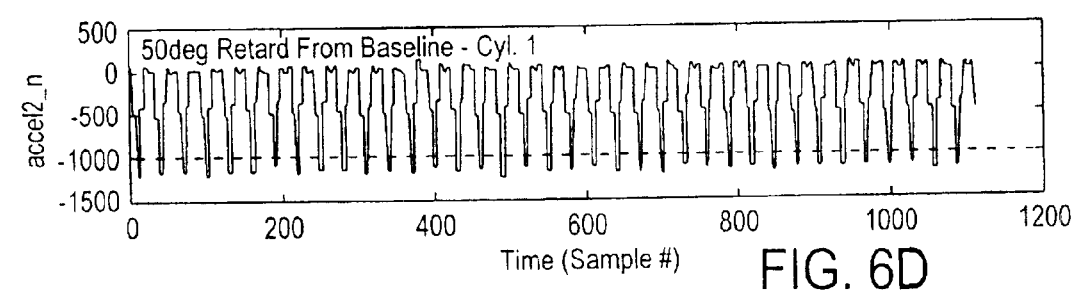
Figure 6E:
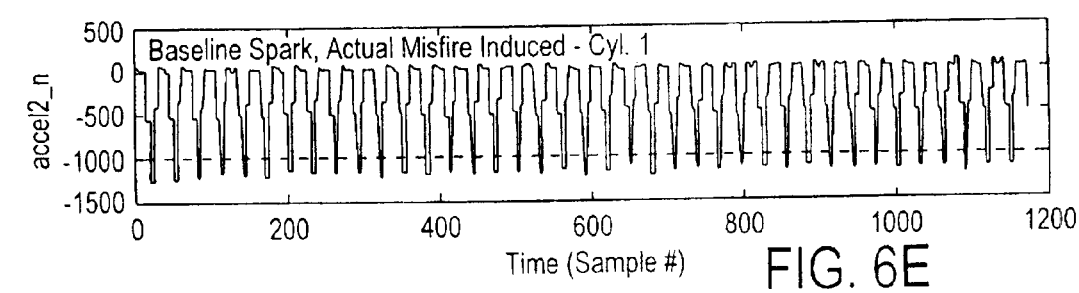
Figure 7:
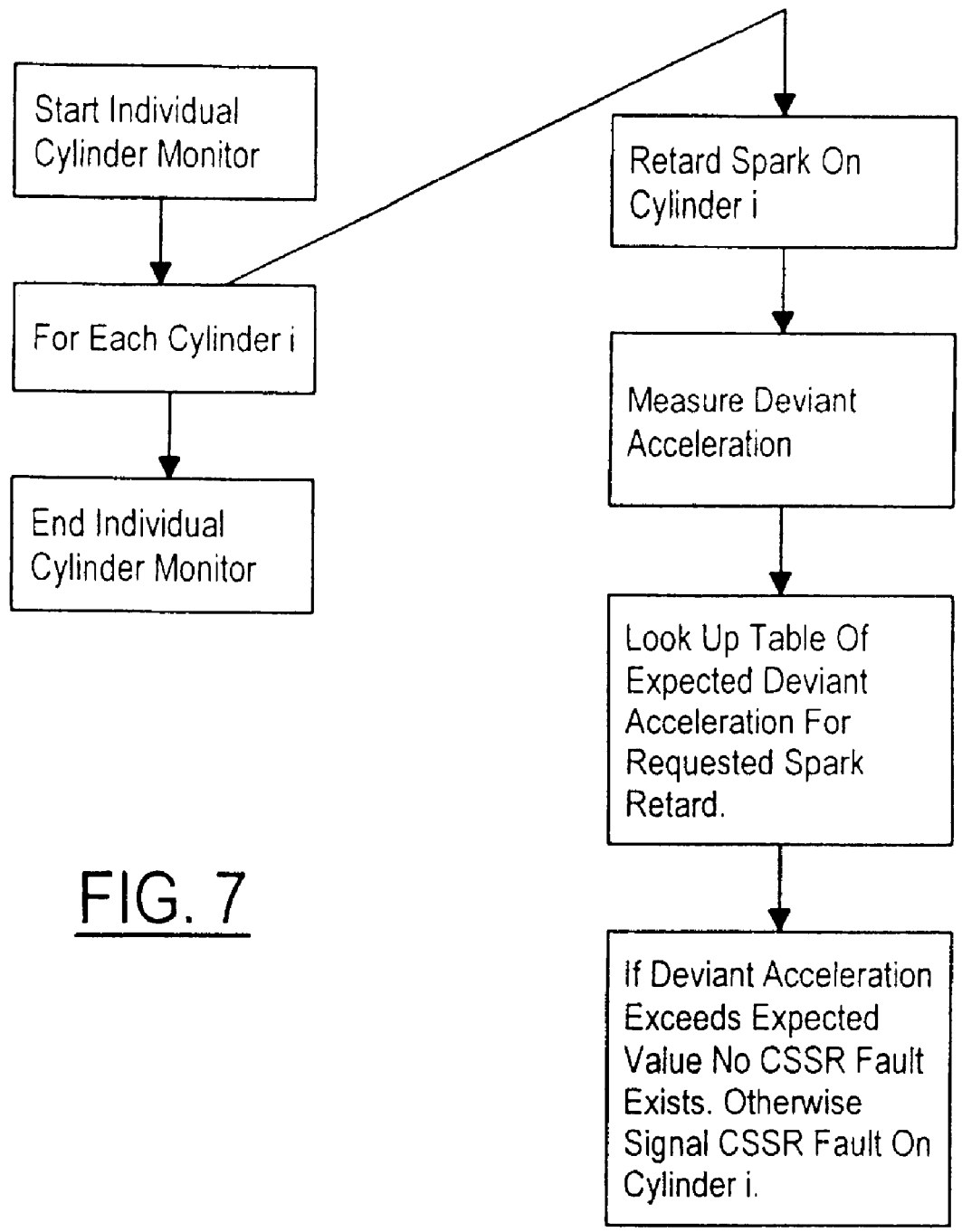
FIG. 7 is a flow chart illustrating the method of confirmation of spark retard when determining if deviant acceleration exceeds a threshold level.

Referring to FIGS. 6A–6E and 7, an alternative preferred method is provided for confirmation of spark retard. In the alternative technique, a first group of cylinders is selected for monitoring. The first group of cylinders should be less than half of a representative group of cylinders and typically will be one or two cylinders (FIG. 7 illustrates a single cylinder operation). The acceleration deviation signal for the selected cylinder(s) will be generated and an evaluation will be made of its signal level.

As shown in FIGS. 6B–6D, the (absolute valve) signal level of crankshaft acceleration deviation increases with spark retardation. FIG. 6E illustrates the signal generated with a total spark misfire event. The engine controller will be preprogrammed to generate a predefined amount of spark retardation. A comparator will be provided to compare the level of the deviant acceleration to see if it matches an expected threshold value. The threshold value will be dependent upon the regime (angle) of spark retardation which is desired. If the deviant acceleration reaches the threshold value, then spark retardation will be confirmed for that cylinder or group of cylinders. If no cold start spark retard fault condition exists, the controller will then be commanded to return the first cylinder(s) to their prior nominal operation. If a fault condition exists, a cold start spark retard fault signal will be generated.

The level of the nominally operated cylinders will be generally equal to that shown in FIG. 6A. Another cylinder or group of cylinders will then be commanded to undergo spark retardation. In a like manner, the acceleration deviation signal level will be taken and if the appropriate values are confirmed, a confirmation signal will be generated by the engine controller. The process will be repeated until all cylinders of the engine have had confirmed spark retard operation. The confirmation process will typically only require a period of eight revolutions per cylinder. After spark retard has been confirmed for all the cylinders, spark retard will be demanded for all the cylinders.

While preferred embodiments of the invention have been shown and described, it will be understood that such embodiments are provided by way of example only. Numerous variations, changes and substitutions will occur to those skilled in the art without departing from the spirit of the invention. Accordingly, it is intended that the appended claims cover all such variations as may fall within the spirit and scope of the invention.

What is claimed is:

1. A method to verify cold start spark retard in a reciprocating piston internal combustion engine comprising:

measuring engine acceleration corresponding to each of a plurality of representative cylinder firings during operation of said engine;

determining an average acceleration over a series of firings of said plurality of representative cylinder firings;

determining deviation of each one of said representative cylinder firing accelerations from said average acceleration;

determining a variance of said cylinder firing acceleration deviations; and comparing said variance of said cylinder firing acceleration deviations with a variance representative of spark retard condition to confirm the presence of spark retard.

2. The method as described in claim 1, wherein said plurality of representative cylinders includes all said cylinders of said engine.

3. The method as described in claim 1, further comprising the step of generating an error signal based at least in part on said comparison step.

4. The method as described in claim 1, further comprising the step of providing an indication of spark retard condition based at least in part on said comparison step.

5. A method to verify cold start spark retard in a reciprocating piston internal combustion engine comprising:
  measuring engine acceleration corresponding to each of a plurality of cylinder firings during operation of said engine;
  selecting a first group of cylinders for detection from said plurality of cylinders, said first group being less than half of said plurality of cylinders;
  determining an average acceleration over a series of firings of said plurality of cylinders;
  determining acceleration deviation level of said first group of cylinder firing acceleration from said average acceleration for said plurality of cylinders; and
  comparing said first group acceleration deviation level to an expected acceleration deviation level to confirm spark retard in said first group of cylinders.

6. The method as described in claim 5 further including signaling a confirmation or signaling a failure of said first group acceleration deviation level to confirm spark retard.

7. The method as described in claim 5 wherein said first group is comprised of a single cylinder.

8. The method as described in claim 5 wherein said first group includes more than one cylinder.

9. The method as described in claim 5 wherein said expected level of acceleration deviation is a function of an amount of spark retard commanded.

10. A system for verifying cold spark retard in an internal combustion engine having a plurality of cylinders and corresponding reciprocating pistons, comprising:
  at least one sensor for measuring a signal indicative of engine acceleration corresponding to each of a plurality of representative cylinder firings during operation of the engine; and
  a controller coupled to said at least one sensor for determining an average acceleration over a series of firings of the plurality of representative cylinder firings, determining a variance of the cylinder firing acceleration deviations, and comparing the variance of the cylinder firing acceleration deviations with a predetermined variance representative of spark retard condition to confirm the presence of spark retard.

11. The system as described in claim 10, further comprising a device coupled to the controller for providing an indication of spark retard condition to a vehicle operator.

* * * * *